United States Patent [19]

Barnhill et al.

[11] Patent Number: 5,094,281
[45] Date of Patent: Mar. 10, 1992

[54] DEBARKING/DELIMBING APPARATUS

[75] Inventors: Dennis K. Barnhill; Lee B. Hutt, both of Truro, Canada

[73] Assignee: Barnhill Equipment Ltd., Truro, Canada

[21] Appl. No.: 645,998

[22] Filed: Jan. 25, 1991

[51] Int. Cl.$^5$ .............................................. B27L 1/10
[52] U.S. Cl. ............................... 144/208 J; 51/334; 144/2 Z
[58] Field of Search .................... 51/331, 332, 334; 144/2 Z, 208 R, 208 J, 341, 343

[56] References Cited

U.S. PATENT DOCUMENTS

| 1,692,029 | 11/1928 | Elliott | 144/208 J |
| 2,653,635 | 9/1953 | Denison | 144/208 J |
| 2,800,935 | 7/1957 | Hosmer | 144/208 J |

FOREIGN PATENT DOCUMENTS

| 598362 | 5/1960 | Canada . |
| 662905 | 5/1963 | Canada . |
| 964965 | 3/1975 | Canada . |
| 1035673 | 8/1978 | Canada . |
| 1073784 | 3/1980 | Canada . |
| 1074213 | 3/1980 | Canada . |
| 1080584 | 7/1980 | Canada . |
| 1189765 | 7/1985 | Canada . |
| 1045790 | 10/1966 | United Kingdom ............ 144/208 J |

Primary Examiner—W. Donald Bray
Attorney, Agent, or Firm—Beveridge, DeGrandi & Weilacher

[57] ABSTRACT

Debarking/delimbing apparatus comprises at least one spool device mountable and rotatably driven about an axis and capable of removing bark from tree parts moved lengthwise across its axis. Each spool device has two end members rotatable about the axis and each of which supports the ends of several shafts which extend between the ends members parallel with the axis and equally spaced from and around the axis. Each of said shafts has, spaced along its length, a series of solid debarking elements, each element being eccentrically and rotatably mounted on its respective shaft so that when the spool device is rotated centrifugal forces will cause the elements to project outwardly from the device so as to contact tree part, the elements being provided with protrusions for scraping off bark. The spool device is arranged so that all of said elements are completely rotatable about said shafts without interference with each other or with any part of the device.

10 Claims, 2 Drawing Sheets

DEBARKING/DELIMBING APPARATUS

The present invention provides apparatus for removing bark and limbs from trees or tree parts.

While the apparatus of this invention may have many different applications, a particular utility is in debarking and delimbing small trees, from about 3 inches to about 12 inches diameter, which are to be used to produce pulp for paper making. For the production of good quality paper, it is required that almost all of the bark should be removed from the trees, i.e. all but about 0.5% of the bark.

Various rather complex debarkers have been designed and made for removing bark from trees in pulp mills. However, the present invention is particularly concerned with a rather simple and readily mobile apparatus which can be used on mobile equipment used in the forest.

There has been a trend in recent years to producing chips from trees in the forest itself, so that waste products, which are of course bio-degradable, can be immediately returned to the forest floor; this requires a mobile debarker. One kind of mobile debarker which has been used for this purpose is the so-called ring debarker, in which a ring, rotatable about its own axis, carries a series of arms which are pivotally mounted inside the ring and carry debarking tools which remove the bark from a tree trunk fed through the ring. While these are good for fairly large diameter tree trunks, on smaller sizes (e.g. 3 to 8 inches) the rate of production is rather slow, especially because only one trunk at a time can be fed through the debarker.

For forestry processing of small sizes of wood, it is known to use a so-called flail debarker; this has the advantage that several trunks at a time can be fed through so giving adequate output. Such a flail device has one or two rotatable drums with a series of chains having their inner ends connected to the drum with the remaining chain loose so as to extend outwardly from the drums when the drums are rotated at a high speed. Trees to be delimbed and barked are passed, lengthwise, across such drums so that the chains strike the limbs and remove these and the bark. While these chain flails are commonly used they suffer from well known drawbacks. Firstly, they do not reliably remove 99.5% of the bark, especially from small trees, due to the random manner in which the chains hit the trees. Secondly, the chains frequently break, and replacing the chains involves a significant cost in operating such equipment. Chain breakage is caused in part by the fact that the chains strike not only the wood but also, after striking the wood, curl back and strike the drum, and also hit other chains.

A most cost effective way of producing chips in the forest would be to set a flail unit adjacent to a chipper permitting the debarked stems to pass directly from the debarker to the chipper. However, this is impractical since pieces of broken chain entering the chipper could do serious damage.

Examples of chain flails, for debarking/delimbing are shown in the following prior patents:

Canadian Patent No.

598,362, issued May 17, 1960 to Ontario Paper Company Limited;
964,965, issued Mar. 25, 1975 to Stadnik;
1,035,673, issued Aug. 1, 1978 to Larson;
1,073,784, issued Mar. 18, 1980 to Forano Limitee;
1,074,213, issued Mar. 25, 1980 to Forano Limitee; and
1,080,584, issued July 1, 1980 to The Northern Engineering and Supply Co. Limited.

Another type of flail device, although not using chains, is shown in Canadian Patent No. 1,189,765, issued on July 2, 1985 to Wilbur Peterson and Sons, Inc.

The present invention provides a device which is particularly suitable for use in mobile forestry equipment for removing bark and limbs from small diameter trees. Large branches may also be debarked; hereafter, the term "tree parts" is used for both tree trunks or branches or portions thereof. The apparatus is similar to the flails described above in that it incorporates at least one rotatable device and means for rotating this, the device being equipped to debark and/or delimb a tree part fed longitudinally across the axis of rotation. However, the rotatable device does not have any chains or flexible elements subject to breakage; rather it has solid debarking elements which are eccentrically mounted on shafts and which are completely rotatable about the shafts without striking any other part of the device. The term "solid" is used herein in the sense of the dictionary meaning i.e. "a substance exhibiting rigidity", in contrast to the prior art flexible elements. Since the debarking elements are solid and do not strike anything other than the wood they are not subject to breakage.

In accordance with the present invention debarking/delimbing apparatus comprises at least one spool device mounted so as to be rotatably driven about an axis and capable of removing bark and/or limbs from a tree part moved lengthwise relative to the spool device across its axis, each spool device having two end members supporting the ends of several shafts which extend between the two end members, with these shafts being parallel and equally spaced from the rotational axis of the device and from each other. Each of the shafts has, spaced along its length, a series of debarking elements each eccentrically and rotatably mounted on a respective shaft so that when the spool device is rotated centrifugal force causes the elements to project outwardly from the device into contact with the tree part. The elements are provided with tooth-like protrusions for scraping bark off the tree part. The elements are completely rotatable about the shafts without interference with each other or any part of the device.

Preferably, the spool device has three shafts all equally spaced from its rotational axis, and the debarking elements of each shaft are staggered with respect to elements of the two other shafts so that elements of adjacent shafts can overlap without interfering with each other.

The spool device may be used as a single unit with a tree part or several tree parts being passed over or under the spool device while this is being rotated, thus removing bark or limbs from one side of the tree parts. The device will remove bark from practically one half of the tree part. The tree parts can then be turned around and the remaining bark removed with another pass. Preferably, however, two spool devices are used and the tree parts are passed between these so that the devices act on opposite sides of the tree parts. The spool devices may be directly opposite each other or may be staggered. If they are directly opposite each other, the separation of their axes will be such that rotatable elements of one of the spool devices closely approach but do not touch the rotatable elements of the other device.

With a staggered arrangement, the spool devices may be set so that their debarking elements pass beyond the centre line of the tree part so that the two devices effectively remove all the bark.

The invention will be further described with reference to the accompanying drawings, in which.

Figure 1:
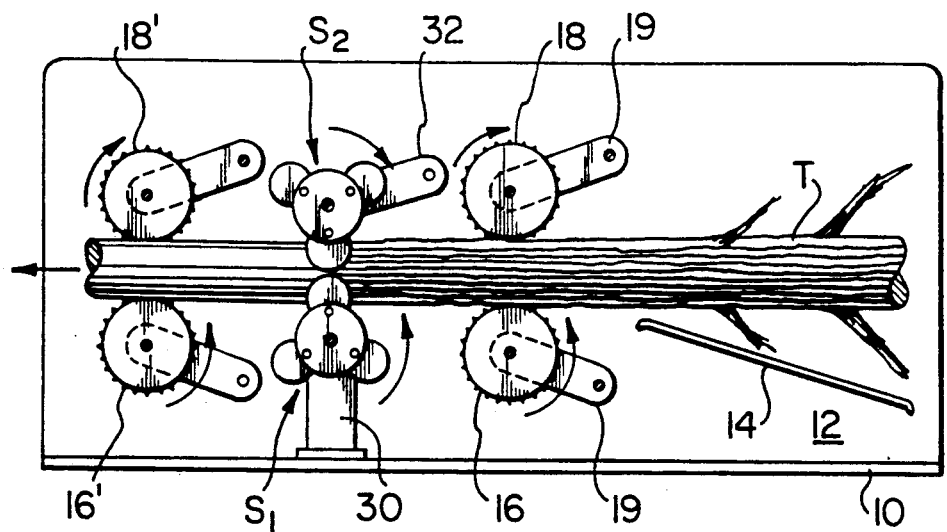
FIG. 1 is a diagrammatic side view through debarking/delimbing apparatus in accordance with the invention, shown with the near side plate and certain support means removed for clarity.

FIG. 1 illustrates how two spool devices in accordance with the invention can be arranged to act on single or multiple tree trunks, and shows guiding and feeding means for the tree trunks. However, it is to be understood that the spool devices which are at the heart of this invention can be used in different ways, either singly, or in pairs as shown in FIG. 1, and for example the spool devices can be used in generally similar manners to the flail devices shown in the above mentioned Canadian patents Nos. 598,362, 1,073,784, and 1,189,765.

The apparatus shown in FIG. 1 includes a base member 10 carrying two side plates 12, the rear most being shown. The two side plates support a lower guide plate 14 which guides tree parts T between a lower roller 16 and an upper roller 18. These feed rollers are mounted on pivotal arms 19 which are spring urged to keep the rollers in firm contact with the tree parts.

Similar feed rollers 16' and 18' are provided at the outlet end of the apparatus, these being similarly mounted. All of the feed rollers have small projections or studs to assist in gripping the tree, and all are driven by suitable means such as by sprocket chains connected to motors to move the tree part through the apparatus in the direction shown. Preferably, the studs or projections on the feed rollers are arranged in a spiral pattern which tends to rotate the tree part as this is fed through the apparatus, between the lower and upper spool devices S1 and S2 made in accordance with the invention, and which are arranged between the two sets of rollers. The lower spool device is fixedly mounted on support 30, whereas the upper spool device is mounted on a pivoting arm 32. However, depending on the range of tree sizes being used, both spool devices may have fixed axes.

The spool devices S1 and S2, which are identical to each other, will now be more particularly described with reference to FIGS. 2 and 3. As shown in these drawings, each spool device has two end support members 40 which are in the form of circular plates, each plate having an outwardly projecting central stub shaft 42. These stub shafts are rotatable in the mounting means 30 and 32 shown in FIG. 1, and means, not shown, are provided for rotating the spools at a speed which will depend on the sizes of the spools but will usually be about 200-300 RPM, in the direction indicated in FIG. 1; i.e. in the same direction as the feed rollers. The speed of movement of the periphery of the spool devices (indicated at P) will however be much faster than the speed of movement of the tree part caused by the rollers. The stub shafts terminate at the end plates so there is a clear central area between the end plates in which the debarking elements can move.

The two end plates 40 of each spool device fixedly support three shafts 44 which are equally spaced from the axis of the stub shafts 42 and which are equally spaced around the end plates, i.e. each subtends 120° with the adjacent shaft.

Figure 2:
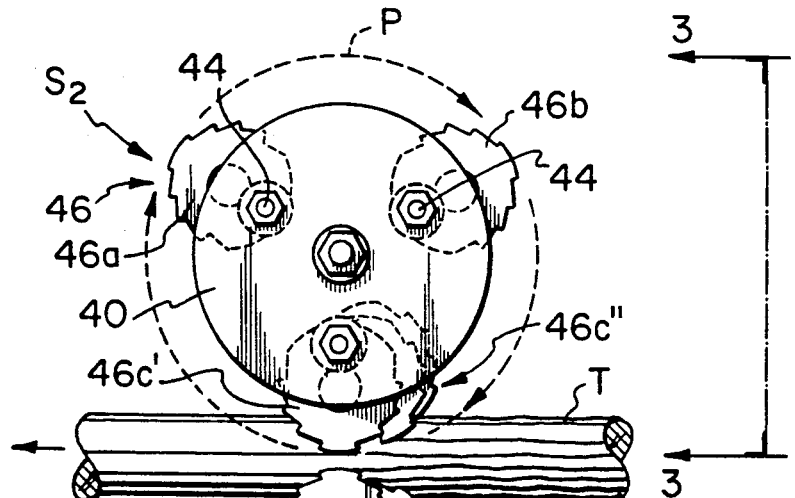
FIG. 2 shows an enlarged diagrammatic view of two spool devices of the invention acting on a single tree trunk.
Figure 2A:
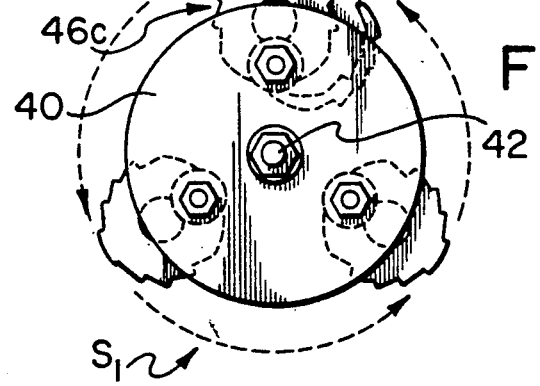
FIG. 2a shows detail of a debarking element.
Figure 2A:
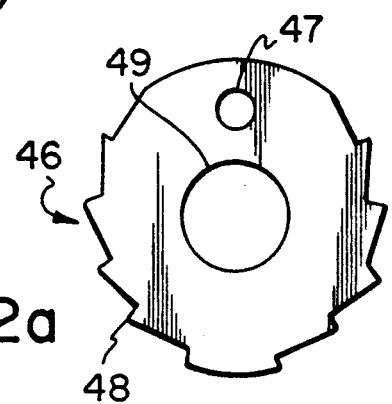
Figure 3:
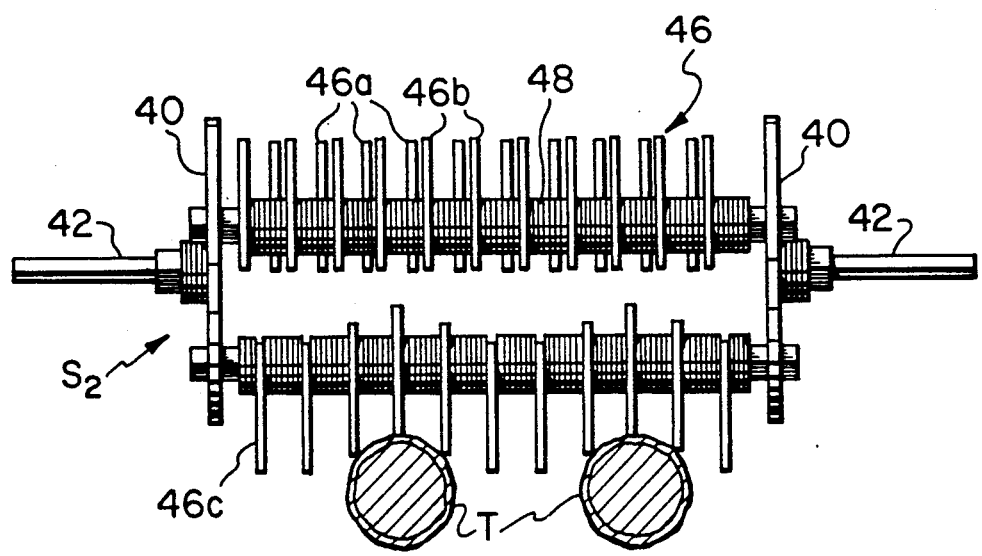
FIG. 3 shows a diagrammatic view taken on lines 3—3 of FIG. 2 showing how one spool acts on tree trunks.

As shown in FIG. 3, each of the three shafts 44 supports a series of debarking elements 46, each equally spaced along the shaft by spacer members 48. The elements are referred to as being "debarking" since this is their main function, although they will also remove limbs from small trees. As shown in FIGS. 2 and 2a, each debarking element is generally in the form of a disc having an eccentric bore 47, close to one side of the disc, by which it is rotatably mounted on its shaft. The eccentricity of each disc is preferably at least one half its radius. The discs are provided with blunt, roughly square edged teeth 48 which extend from an outer end of the disc, i.e. that part most removed from the shaft, to close to the inner end, at least beyond a point roughly level with the shaft, taken on a line normal to the axis of the disc between the shaft and its end. The discs are provided with teeth on both sides of the leading and trailing edges; although only the teeth on one edge are operative in one position of the disc, this allows the arrangement to be reversed when the teeth on one side are worn. As will be seen by reference to FIG. 2a, the teeth can be formed by cutting material from an initially circular disc.

The size of the discs 46, and their eccentricity, is chosen so that each disc can rotate through 360° on its shaft without interfering with the other shafts or spacers thereon. Also, the discs on the respective shafts are staggered so that the discs of one shaft cannot interfere with those of another shaft although they overlap. Since all the discs are identical, this means that the discs of each shaft must be spaced apart more than the width of two discs. The teeth on the discs may be offset at either side of the disc, thus increasing the effective width, and the disc spacing must of course allow for this. For example, a disc of one quarter inch width may have its teeth offset by ¼ inch at each side of the disc, giving it an effective width of ¾ inch. This offset allows discs to be relatively light even for a large effective width. Additional lightness may be achieved by forming a central aperture in the disc as shown at 49 in FIG. 2a. If discs are too heavy they may damage the wood. The spacing of ¾ inch discs would be about 1 inch for each disc on the spool, or 3 inches for each disc on one shaft, giving ¼ inch clearance between overlapping discs.

The operation of the apparatus can be understood with reference to FIGS. 2 and 3. The spools S1 and S2 will be rotated in the directions shown in such a way that action of the debarking elements on the tree part T assists this in its passage through the apparatus. The spools are rotated at such speed to ensure that centrifugal force normally maintains the discs extended from their shafts, as illustrated in FIG. 2 for discs 46a and 46b. The discs 46c are those which, at the instant shown, are performing the debarking function. Those discs, for example disc 46c', which are adjacent the sides of the tree trunk contact this when almost fully extended from the spool device, and are deflected only by a small amount in their rotation. However, those discs such as 46c" which are adjacent the centre line of the trunk, contact this as the associated shaft approaches the trunk and are then pivoted backwards as illustrated in FIG. 2. During this pivoting movement several of the teeth 48 successively contact the tree bark and remove this with a scraping motion. As the spool rotates the debarking elements gradually become clear of the trunk and centrifugal force returns them to the outwardly extended position.

FIG. 3 shows a spool mounted so that the outer most reach of its debarking elements is just short of the centre line of the tree trunk. The maximum radial amount by which the discs can move, to accommodate the radius of a tree trunk without the spool moving, is equivalent to twice the eccentricity of the discs. For example, if 12 inch discs are mounted at a 3 inch eccentricity, they can accommodate tree trunks having a radius of 6 inches and therefore a diameter of 12 inches, without the spools moving apart. Assuming that the upper spool is movably mounted, as shown, larger trunks can be accommodated but they will not be completely debarked at a single pass.

Figure 4:
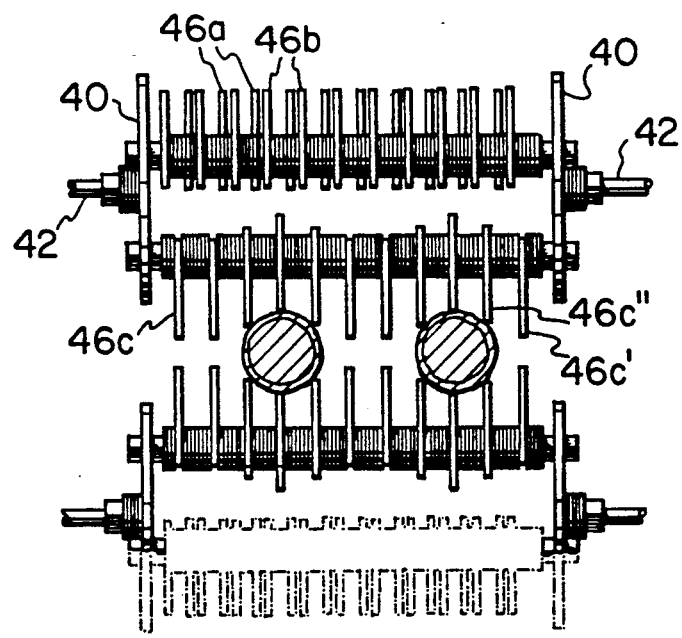
FIG. 4 shows a view similar to FIG. 3, but showing the manner in which two spool devices act simultaneously on several tree trunks.

FIG. 4 shows how two spool devices, mounted as shown in FIG. 1, can be used to debark both sides of several small tree trunks or tree parts simultaneously. The ability to debark several small tree trunks simultaneously is a great advantage of this type of apparatus as compared to ring debarkers which can only debark one tree trunk at a time.

It is important to note that in accordance with the invention the debarking elements do not, in operation, contact anything other than the wood. This provides a great advantage as compared to chain flails where the chains hit the drums and hit each other and are subject to much abrasion and breakage.

While it is convenient to form the debarking elements from discs, this is of course not essential and other shapes could be used provided that the elements have a generally convex arrangement of several teeth which can scrape off bark.

It is also possible that in larger sizes of spool, an additional support plate may be provided between the end plates 40, to give extra support to shafts 44.

It is also contemplated that a debarker/delimber may have two sets of spool devices as described, having different disc sizes. These may rotate in opposite directions, with the larger spool rotating in the direction which assists the tree part in its movement.

The apparatus as described will also remove the limbs from small trees. For larger trees, it is contemplated that debarking would be preceded by a delimbing step. Many types of delimbers for large trees, which do not remove bark, are already known, and some such devices may be combined with the debarking apparatus of this invention so that trees can be delimbed and debarked simultaneously.

We claim:

1. Debarking/delimbing apparatus comprising at least one spool device mountable to be rotatably driven about an axis and capable of removing bark from tree parts moved lengthwise relative to said device across said axis;

each spool device having two end members each rotatable about said axis and each supporting the ends of several shafts which extend between the end members parallel with said axis and equally spaced from and around said axis;

each of said shafts having, spaced along its length, a series of solid debarking elements, each element being eccentrically and rotatably mounted on its respective shaft so that when the spool device is rotated centrifugal forces will cause the elements to project outwardly from the device so as to contact a tree part, said elements being provided with protrusions for scraping off bark;

said elements being completely rotatable about said shafts without interference with each other or with any part of the device.

2. Apparatus according to claim 1, wherein the spool device comprises three said shafts each with debarking elements.

3. Apparatus according to claim 1, wherein said debarking elements are spaced apart on each of said shafts, and wherein the elements of one shaft are staggered with respect to elements on adjacent shafts so that during rotation of said elements these can overlap without interfering with each other.

4. Apparatus according to claim 1, further comprising means for mounting and rotatably driving said spool device about its axis, and means for axially moving a tree part substantially perpendicularly to said axis.

5. Apparatus according to claim 2, further comprising means for mounting and rotatably driving said spool device about its axis, and means for axially moving a tree part substantially perpendicularly to said axis.

6. Debarking/delimbing apparatus comprising at least one spool device mounted to be drivingly rotated about an axis and capable of removing bark from a tree part moved lengthwise relative to said device across said axis;

each spool device having two end plates each supported by outwardly projecting axle means having their inner ends located at opposite ends of a clear central space between the plates, these plates supporting the ends of three shafts which are each parallel to said axis and equally spaced from and around said axis;

each of said shafts having, spaced along its length, a series of debarking elements each element rotatably and eccentrically mounted on the respective shaft so that when the spool device is rotated centrifugal force will cause the elements to project outwardly from the device into contact with a tree part, said elements being provided with tooth-like protrusions for scraping bark off the tree part;

said elements of each shaft being staggered relative to those of the other two shafts and all of said elements being confined to said clear central space between the end plates, so that the elements of adjacent shafts can overlap with each other while being capable of rotating completely around its supporting shaft without contacting any other element or any part of the spool device.

7. Debarking/delimbing apparatus according to claim 6, wherein each of said debarking elements comprises essentially a disk having an eccentric bore by which it is mounted on the shaft, parts of the disc remote from the bore having the tooth-like protrusions.

8. Debarking/delimbing apparatus according to claim 6, wherein said tooth-like protrusions are provided on both the leading and trailing edges of said debarking elements.

9. Debarking/delimbing apparatus according to claims 6, 7 or 8, wherein the teeth-like protrusions of the debarking elements are offset to opposite sides of said elements so that the effective width of the toothed operating part of the element is greater than a main part of the element.

10. Apparatus according to any of claims 1 to 3, comprising two of said spool devices mounted parallel to each other and spaced apart so that the elements of one device are always clear of those of the other device when the spools rotate, and wherein means are provided for axially moving tree parts between the two devices substantially perpendicularly to the said axes of the devices so that opposite sides of each tree part are acted upon by the two devices.

* * * * *